United States Patent
Huang et al.

(10) Patent No.: US 11,091,395 B2
(45) Date of Patent: Aug. 17, 2021

(54) MULTIFUNCTIONAL GYPSUM-BASED MORTAR AND METHOD OF MAKING SAME

(71) Applicant: BEIJING BUILDING MATERIALS ACADEMY OF SCIENCES RESEARCH, Beijing (CN)

(72) Inventors: Tianyong Huang, Beijing (CN); Zhaojia Wang, Beijing (CN); Wencai Zhang, Beijing (CN); Yinming Li, Beijing (CN); Yinxiang Zhang, Beijing (CN); Xufeng Chen, Beijing (CN)

(73) Assignee: BEIJING BUILDING MATERIALS ACADEMY OF SCIENCES RESEARCH, Beijing (CN)

( * ) Notice: Subject to any disclaimer, the term of this patent is extended or adjusted under 35 U.S.C. 154(b) by 0 days.

(21) Appl. No.: 16/812,276

(22) Filed: Mar. 7, 2020

(65) Prior Publication Data
US 2021/0053877 A1     Feb. 25, 2021

Related U.S. Application Data

(63) Continuation of application No. PCT/CN2019/129855, filed on Dec. 30, 2019.

(30) Foreign Application Priority Data

Aug. 20, 2019   (CN) .......................... 201910770078.4

(51) Int. Cl.
| | | |
|---|---|---|
| *C04B 28/14* | (2006.01) | |
| *C04B 14/08* | (2006.01) | |
| *C04B 14/30* | (2006.01) | |
| *C04B 14/06* | (2006.01) | |
| *C04B 24/26* | (2006.01) | |
| *C04B 24/38* | (2006.01) | |
| *C04B 24/32* | (2006.01) | |
| *C04B 111/00* | (2006.01) | |
| *C04B 103/32* | (2006.01) | |
| *C04B 103/22* | (2006.01) | |
| *C04B 103/46* | (2006.01) | |
| *C04B 103/50* | (2006.01) | |

(52) U.S. Cl.
CPC ............ *C04B 28/147* (2013.01); *C04B 14/06* (2013.01); *C04B 14/08* (2013.01); *C04B 14/305* (2013.01); *C04B 24/2641* (2013.01); *C04B 24/32* (2013.01); *C04B 24/383* (2013.01); *C04B 2103/22* (2013.01); *C04B 2103/32* (2013.01); *C04B 2103/46* (2013.01); *C04B 2103/50* (2013.01); *C04B 2111/00482* (2013.01)

(58) Field of Classification Search
CPC ....... C04B 14/06; C04B 14/08; C04B 14/305; C04B 20/008; C04B 24/06; C04B 24/14; C04B 24/2641; C04B 24/2647; C04B 24/32; C04B 24/383; C04B 28/14; C04B 28/147; C04B 2103/0057; C04B 2103/20; C04B 2103/22; C04B 2103/32; C04B 2103/46; C04B 2103/50; C04B 2103/54; C04B 2111/00008; C04B 2111/00017; C04B 2111/00267; C04B 2111/00482; C04B 2111/00517
See application file for complete search history.

(56) References Cited

U.S. PATENT DOCUMENTS

2011/0024702 A1    2/2011   Roman Aleman et al.

FOREIGN PATENT DOCUMENTS

| CN | 104402347 A | * 3/2015 |
|---|---|---|
| CN | 108623198 A | 10/2018 |
| CN | 109734402 A | 5/2019 |

* cited by examiner

*Primary Examiner* — Anthony J Green

(57) ABSTRACT

Disclosed are a multifunctional gypsum-based mortar and a method of making the same, where the gypsum-based mortar includes 30-40 parts by weight of a gypsum; 30-40 parts by weight of a diatomite; 0.5-3.0 parts by weight of nano $TiO_2$; and 30-40 parts by weight of a fine aggregate. The gypsum-based mortar provided herein can not only has good adsorption to the formaldehyde based on the hydration structure of gypsum-based cementing material and the diatomite structure, but also decompose the formaldehyde adsorbed by the porous structure, ensuring long-term and effective adsorption to formaldehyde.

14 Claims, No Drawings

MULTIFUNCTIONAL GYPSUM-BASED MORTAR AND METHOD OF MAKING SAME

CROSS-REFERENCE TO RELATED APPLICATIONS

This application claims the benefit of priority from Chinese Patent Application No. 201910770078.4, filed on Aug. 20, 2019. The content of the aforementioned application, including any intervening amendments thereto, is incorporated herein by reference in its entirety.

TECHNICAL FIELD

This application relates to gypsum-based mortars, and more particularly to a gypsum-based mortar capable of absorbing formaldehyde to purify the air and a method of making the same.

BACKGROUND

Currently, more and more new building and decoration materials such as various artificial boards, adhesives and coatings, are developed and increasingly used in the interior decoration. However, the development of the interior decoration has gradually led to serious indoor environmental pollution. At the same time, with increasing attention paid to the living environment closely associated with the life quality, indoor gas pollutants, especially formaldehyde, have become more and more intolerable. Since many materials used in the decoration of homes and offices, such as decorative coatings, paints and adhesives used in the artificial boards, can release formaldehyde to the air, the formaldehyde will accumulates at a high level in the newly-decorated buildings, and even greatly exceed the national standards. Long-term exposure to formaldehyde will cause headache and weakness, and even cancers, such as oral cancer, skin cancer, lung cancer and leukemia. Therefore, there is an urgent need to develop a method of effectively removing the formaldehyde in the air.

Currently, the problem of formaldehyde pollution is mainly solved by: (1) continuously reducing the formaldehyde in the decoration materials; and (2) developing decorative materials capable of absorbing, however, the effect of the first method is limited.

Indoor air purification materials are divided into: (1) physical purification materials including activated carbon, silica gel and zeolite, where the activated carbon has good adsorption performance and wide application, but has slow adsorption and low adsorption index for low concentration of harmful gases; (2) chemical purification materials including photocatalysts and negative ion materials, where the photocatalysts, with $TiO_2$ as a representative, have wide application, but are limited due to the requirement of ultraviolet radiation; and the negative ion materials can eliminate the harmful substances through the redox reaction; and (3) biological purification materials, mainly including green plants and biological enzymes. In addition to the above purification materials, there are still some commercially-available purification products, such as air purifiers, purification coatings, spraying liquid products and solid adsorption materials. Among the products, the coatings, as building materials, are commonly used, but they have poor aging resistance due to the presence of organic materials. Moreover, diatomite-based decorative materials, mainly imported from South Korea and Japan, are also widely applied, but they still involve many defects, for example, these materials have only a single adsorption function and no catalytic action, and may undergo adsorption saturation and desorption; these materials have large alkalinity, which will affect the human health; and these materials have poor water resistance and durability. Given the above, it is required to develop a multifunctional solid inorganic purification material.

SUMMARY

An object of this application is to provide a gypsum-based mortar and a method of making the same to overcome the defect in the prior art that there is lack of a material capable of effectively absorbing formaldehyde in the air.

Technical solutions of the invention are described as follows.

In a first aspect, the invention provides a gypsum-based mortar, comprising:
30-40 parts by weight of a gypsum;
30-40 parts by weight of a diatomite;
0.5-3.0 parts by weight of nano $TiO_2$; and
30-40 parts by weight of a fine aggregate.

Mechanical properties of the mortar are mainly derived from the gypsum, of which the hydration can lead to the formation of a hydration structure with a finely-porous structure, providing the mortar with a certain adsorption performance for formaldehyde. Moreover, the diatomite also shows excellent adsorption to formaldehyde due to the loose, light and porous (dominated by mesopores) structure with regular distribution of voids. It has been unexpectedly found herein that after the gypsum is mixed with the diatomite in a certain ratio, the hydration structure of the gypsum-based cementitious material together with the diatomite enable the gypsum-based mortar to have a formaldehyde adsorption rate of 75% or more, significantly improving the formaldehyde adsorption performance. On this basis, the invention further introduces nano $TiO_2$ in an appropriate proportion, which facilitates the decomposition of formaldehyde adsorbed by the above porous structure, ensuring long-term and effective adsorption to formaldehyde.

In an embodiment, the gypsum-based mortar comprises 30-35 parts by weight of the gypsum, 30-35 parts by weight of the diatomite, 1-2 parts by weight of the nano $TiO_2$ and 30-35 parts by weight of the fine aggregate.

In an embodiment, the gypsum-based mortar comprises 31.015 parts by weight of the gypsum, 32 parts by weight of the diatomite, 1.5 parts by weight of the nano $TiO_2$ and 30 parts by weight of the fine aggregate.

In an embodiment, in order to further decompose harmful substances and adjust the indoor humidity to ensure a comfortable environment, the gypsum-based mortar further comprises 2-8 parts by weight of a negative ion powder, preferably 3-7 parts by weight of the negative ion powder, and more preferably 4.5 parts by weight of the negative ion powder.

It has been surprisingly found herein that due to the simultaneous presence of the gypsum, the diatomite, the nano $TiO_2$ and the negative ion powder, the gypsum-based mortar of the invention has high purification rate and good purification durability for formaldehyde. In addition, the indoor humidity is beneficial to improve the durability of the gypsum-based mortar.

In an embodiment, in order to meet the needs of different color decoration environments, the gypsum-based mortar further comprises 0.1-1.0 part by weight of an inorganic pigment, such as 0.1 part, 0.5 part and 1.0 part.

In an embodiment, the gypsum-based mortar further comprises one or more admixtures selected from the a water reducing agent, a dispersing agent, a gypsum retarder, a water retaining agent and a defoaming agent, where the specific amount and type can be determined according to the actual requirements.

In an embodiment, the gypsum-based mortar comprises 30-40 parts by weight of the gypsum, 30-40 parts by weight of the diatomite, 0.5-3.0 parts by weight of the nano $TiO_2$, 30-40 parts by weight of the fine aggregate, 2-8 parts by weight of the negative ion powder, 0.10-0.15 part by weight of a polycarboxylate superplasticizer, 0.05-0.15 part by weight of a redispersible emulsion powder, 0.025-0.045 part by weight of the gypsum retarder, 0.05-0.10 part by weight of the water retaining agent, 0.10-0.20 part by weight of the defoaming agent and 0.1-1.0 part by weight of the inorganic pigment. Based on such composition, the gypsum-based mortar has functions of adsorbing formaldehyde to purify the air, releasing negative oxygen ions to adjust the humidity and presenting various colors for decoration.

In an embodiment, the gypsum-based mortar comprises 30-35 parts by weight of the gypsum, 30-35 parts by weight of the diatomite, 1-2 parts by weight of the nano $TiO_2$, 30-35 parts by weight of the fine aggregate, 3-7 parts by weight of the negative ion powder, 0.10-0.15 part by weight of the polycarboxylate superplasticizer, 0.08-0.12 part by weight of the redispersible emulsion powder, 0.025-0.04 part by weight of the gypsum retarder, 0.05-0.10 part by weight of the water retaining agent, 0.10-0.20 part by weight of the defoaming agent and 0.1-1.0 part by weight of the inorganic pigment.

In an embodiment, the gypsum-based mortar comprises 31.015 parts by weight of the gypsum, 32 parts by weight of the diatomite, 30 parts by weight of the fine aggregate, 4.5 parts by weight of the negative ion powder, 1.5 parts by weight of the nano $TiO_2$, 0.12 part by weight of the polycarboxylate superplasticizer, 0.1 part by weight of the redispersible emulsion powder, 0.035 part by weight of the gypsum retarder, 0.08 part by weight of the water retaining agent, 0.15 part by weight of the defoaming agent and 0.5 part by weight of the inorganic pigment.

In an embodiment, the gypsum-based mortar has a total weight of 100 parts. In an embodiment, the gypsum is a α- or β-hemihydrate gypsum, preferably a desulfurized hemihydrate gypsum.

In an embodiment, the diatomite is a non-calcined or calcined diatomite and has 70% or more by weight of $SiO_2$, preferably the non-calcined diatomite. Preferably, the diatomite has 75%-85% by weight of $SiO_2$.

In an embodiment, the nano $TiO_2$ has a diameter of 100 nm or less, preferably 10-30 nm.

In an embodiment, the fine aggregate is a natural river sand, a machine-made sand or a tailing sand, preferably the natural river sand.

In an embodiment, the fine aggregate is prepared from a combination of two kinds of natural sands respectively having a size of 40-70 mesh and 70-140 mesh (greater than 70 mesh) in a ratio of 2:1, which enables the fine aggregate to be prone to close packing to improve the mechanical properties of the mortar. In addition, such fine aggregate can facilitate the increase in the amount of the gypsum and diatomite and promote the formaldehyde purification rate of the gypsum-based mortar.

In an embodiment, the negative ion powder has a rare earth content of 60% or more and a tourmaline powder content of 20% or more.

In an embodiment, the negative ion powder has the rare earth content of 70%-80% and the tourmaline powder content of 20%-30%.

In an embodiment, the water reducing agent is a polycarboxylate superplasticizer.

In an embodiment, the polycarboxylate superplasticizer is a polycarboxylate ether superplasticizer, a polycarboxylate ester superplasticizer or a combination thereof.

In an embodiment, the dispersing agent is a redispersible emulsion powder.

In an embodiment, the redispersible emulsion powder is selected from the group consisting of an ethylene-vinyl acetate copolymer emulsion powder, an ethylene-vinyl chloride-vinyl laurate terpolymer emulsion powder, a vinyl acetate-ethylene-higher fatty acid vinyl ester terpolymer emulsion powder and a combination thereof.

In an embodiment, the gypsum retarder is selected from the group consisting of tartaric acid, citric acid, sodium gluconate, a bone glue protein gypsum retarder and a combination thereof.

In an embodiment, the water retaining agent is selected from the group consisting of methyl cellulose, carboxymethyl cellulose, hydroxyethyl cellulose, hydroxypropyl methyl cellulose and a combination thereof.

In an embodiment, the defoaming agent is a polyether defoaming agent, a higher alcohol fatty acid ester complex, a polyether-modified silicon or a combination thereof.

In an embodiment, the inorganic pigment is selected from the group consisting of metal oxide, chromate, carbonate, sulfate, sulfide and a combination thereof.

In the invention, the gypsum, diatomite, fine aggregate, nano $TiO_2$, negative ion powder, redispersible emulsion powder, retarder, water retaining agent, defoaming agent and inorganic pigment are all commercially available.

In a second aspect, the invention provides a method of preparing the gypsum-based mortar, comprising:

mixing 30-40 parts by weight of the gypsum, 30-40 parts by weight of the diatomite, 0.5-3.0 parts by weight of the nano $TiO_2$ and 30-40 parts by weight of the fine aggregate uniformly under stirring to produce the gypsum-based mortar.

In a third aspect, the invention further provides a method of decorating an interior wall surface in a non-humid environment, comprising:

mixing the gypsum-based mortar with water uniformly under stirring; and applying the mixture of the gypsum-based mortar and water onto the interior wall surface.

In an embodiment, the water is 60%-80% by weight of the gypsum-based mortar.

It has been demonstrated that when the water is 60%-80% by weight of the gypsum-based mortar, the gypsum-based mortar can achieve desirable mechanical properties, which are specifically shown in Table 1.

TABLE 1

Mechanical properties of the gypsum-based mortar

| Index | | |
|---|---|---|
| Setting time/h | Initial setting | 1.0-2.5 |
|  | Final setting | 1.5-3.0 |
| Bending strength/MPa | Oven dry | 1.2-3.5 |
| Compressive strength/MPa | Oven dry | 2.5-4.5 |
| Tensile adhesive strength/MPa | Oven dry | 0.4-0.7 |
| Formaldehyde purification rate % |  | 75-90 |
| Formaldehyde-removing durability % |  | 75-85 |

TABLE 1-continued

Mechanical properties of the gypsum-based mortar

| Index | | |
|---|---|---|
| Releasing amount of negative ions (icon/cm$^3$) | 10000-15000 | |
| Efflorescence | Not found | |

Principles of the invention are described as follows.

The gypsum-based mortar of the invention adopts gypsum as an inorganic cementing material, which contributes to the formation of mechanical properties of the mortar. Moreover, the gypsum can also form a hydration structure with numerous fine pores. Diatomite is a biogenic silicastone, and shows excellent adsorption to formaldehyde due to its loose, light and porous (dominated by mesopores) structure with regular distribution of voids. However, since the porous diatomite only has the function of formaldehyde adsorption, it is required to introduce a nano-TiO$_2$ catalyst to promote the decomposition of the formaldehyde adsorbed by the porous structure of the diatomite, maintaining the adsorption durability. The negative ion powder can release negative ions with one or more negative charges, which are capable of reducing reactive oxygen generated by the pollutants, nitrogen oxides and smokes in the air, reducing the damage of excessive reactive oxygen to human health. In addition, the negative ion powder can also neutralize the positively-charged floating dust to make it aggregate and settle, thereby purifying the air. The inorganic pigment has good durability, and the combination of different inorganic pigments can present various colors. Given the above, a gypsum-based mortar, which is capable of adsorbing formaldehyde to purify the air, releasing negative oxygen ions to regulate humidity and providing multi-colored decorative effect, can be prepared based on the proper combination of such raw materials.

Compared to the prior art, the invention has the following beneficial effects.

(1) The gypsum-based hydration structure together with the diatomite enables the gypsum-based mortar to have a formaldehyde adsorption rate of 75% or more.

(2) The nano-TiO$_2$ catalyst allows the gypsum-based mortar to have a formaldehyde purification durability of 70% or more.

(3) The use of a negative ion powder makes the negative ions released by the gypsum-based mortar reach 10000 icon/cm$^3$ or more.

(4) The inorganic pigment enables the gypsum-based mortar to have a decorative effect.

With the increasing attention to the living environment closely associated with the life quality, there is a need to develop a multi-functional building material. In this regard, the invention provides a gypsum-based mortar having multiple functions of air purification, humidity regulation and decoration herein to meet various requirements.

DETAILED DESCRIPTION OF EMBODIMENTS

The invention will be described below in detail with reference to the embodiments, and these embodiments are not intended to limit the invention. Unless otherwise specified, the methods or conditions mentioned in the following embodiments are known in the art, or are performed as recommended. Unless otherwise specified, the reagents or instruments used below are commercially available.

The desulfurized hemihydrate gypsum is purchased from Shandong Pingyi Jindun Gypsum Products Co., Ltd., which has an initial setting time greater than 6 min, a final setting time less than 30 min, a 2-h bending strength equal to or greater than 5 MPa and a 2-h compressive strength equal to or greater than 10 MPa.

The non-calcined diatomite is purchased from Jilin Yuantong Mineral Co., Ltd., which has a slit-shaped porous structure, and has a specific surface area of 4100 m$^2$/g and an average pore size of 9.64 nm.

The fine aggregate consists of two kinds of natural sands (purchased from Heibei Weichang) respectively having a size of 40-70 mesh and 70-140 mesh in a ratio of 2:1.

The negative ion powder is purchased from Shijiazhuang Chilin Mineral Co., Ltd., which has a particle size of 1500 mesh and is greyish white.

The nano-TiO$_2$ catalyst is an anatase titanium dioxide with a hardness of 5.5-6.0, which is purchased from Jingrui New Materials Co., Ltd.

The polycarboxylate superplasticizer is purchased from Suzhou Xingbang Chemical Building Materials Co., Ltd.; the redispersible emulsion powder is purchased from Jinan Yuekai Chemical Co., Ltd.; the gypsum retarder is purchased from Nanjing Stable Trading Co., Ltd.; the water retaining agent is purchased from Shandong Su Noke Chemical Co., Ltd.; the polyether defoaming agent is purchased from Beijing Jinyuan Donghe Chemical Co., Ltd.; and the inorganic pigment is purchased from Tianjin Shengguangming Pigments Co., Ltd.

The polycarboxylate superplasticizer, redispersible emulsion powder, gypsum retarder, water retaining agent, polyether defoaming agent and inorganic pigment are all powdery.

The gypsum-based mortars prepared in the following examples and comparative examples are tested according to GB/T 28627-2012 for setting time, bending strength, compressive strength and tensile adhesive strength, according to JC/T 1047-2008 for the formaldehyde purification performance and durability and according to JC/T 1024-2007 for efflorescence.

Example 1

Provided herein was a gypsum-based mortar, which was prepared by mixing 31.015 parts by weight of a desulfurized hemihydrate gypsum, 32 parts by weight of a non-calcined diatomite, 30 parts by weight of natural sands, 4.5 parts by weight of a negative ion powder, 1.5 parts by weight of nano TiO$_2$, 0.12 part by weight of a polycarboxylate superplasticizer, 0.1 part by weight of a redispersible emulsion powder, 0.035 part by weight of a gypsum retarder, 0.08 part by weight of a low-viscosity cellulose ether, 0.15 part by weight of a polyether defoaming agent and 0.5 part by weight of an inorganic pigment uniformly.

After mixed with water which was 70% by weight of the gypsum-based mortar, the mechanical properties of the gypsum-based mortar were shown in Table 2.

TABLE 2

Mechanical properties of the gypsum-based mortar prepared in Example 1

| Index | | |
|---|---|---|
| Setting time/h | Initial setting | 2.0 |
| | Final setting | 2.3 |
| Bending strength/MPa | Oven dry | 1.8 |
| Compressive strength/MPa | Oven dry | 3.5 |
| Tensile adhesive strength/MPa | Oven dry | 0.52 |

TABLE 2-continued

Mechanical properties of the gypsum-based mortar prepared in Example 1

| Index | | |
|---|---|---|
| Formaldehyde purification rate % | | 89.2 |
| Formaldehyde-removing durability % | | 79.0 |
| Releasing amount of negative ions (icon/cm$^3$) | | 13220 |
| Efflorescence | | Not found |

Example 2

Provided herein was a gypsum-based mortar, which was prepared by mixing 33.823 parts by weight of a desulfurized hemihydrate gypsum, 30 parts by weight of a non-calcined diatomite, 30 parts by weight of natural sands, 4.0 parts by weight of a negative ion powder, 1.2 parts by weight of nano TiO$_2$, 0.11 part by weight of a polycarboxylate superplasticizer, 0.12 part by weight of a redispersible emulsion powder, 0.037 part by weight of a gypsum retarder, 0.09 part by weight of a low-viscosity cellulose ether, 0.15 part by weight of a polyether defoaming agent and 0.5 part by weight of an inorganic pigment uniformly.

After mixed with water which was 67% by weight of the gypsum-based mortar, the mechanical properties of the gypsum-based mortar were shown in Table 3.

TABLE 3

Mechanical properties of the gypsum-based mortar prepared in Example 2

| Index | | |
|---|---|---|
| Setting time/h | Initial setting | 2.2 |
| | Final setting | 2.8 |
| Bending strength/MPa | Oven dry | 2.5 |
| Compressive strength/MPa | Oven dry | 4.5 |
| Tensile adhesive strength/MPa | Oven dry | 0.63 |
| Formaldehyde purification rate % | | 80.4 |
| Formaldehyde-removing durability % | | 76.5 |
| Releasing amount of negative ions (icon/cm$^3$) | | 10250 |
| Efflorescence | | Not found |

Comparative Example 1

Provided herein was a gypsum-based mortar, which was prepared by mixing 37.515 parts by weight of a desulfurized hemihydrate gypsum, 6 parts by weight of a non-calcined diatomite, 55 parts by weight of natural sands, 0.5 part by weight of nano TiO$_2$, 0.12 part by weight of a polycarboxylate superplasticizer, 0.1 part by weight of a redispersible emulsion powder, 0.035 part by weight of a gypsum retarder, 0.08 part by weight of a low-viscosity cellulose ether, 0.15 part by weight of a polyether defoaming agent and 0.5 part by weight of an inorganic pigment uniformly.

After mixed with water which was 45% by weight of the gypsum-based mortar, the mechanical properties of the gypsum-based mortar were shown in Table 4.

TABLE 4

Mechanical properties of the gypsum-based mortar prepared in Comparative Example 1

| Index | | |
|---|---|---|
| Setting time/h | Initial setting | 1.5 |
| | Final setting | 2.1 |
| Bending strength/MPa | Oven dry | 5.7 |
| Compressive strength/MPa | Oven dry | 13.5 |
| Tensile adhesive strength/MPa | Oven dry | 0.89 |
| Formaldehyde purification rate % | | 35.4 |
| Formaldehyde-removing durability % | | 32.1 |
| Releasing amount of negative ions (icon/cm$^3$) | | 310 |
| Efflorescence | | Not found |

Comparative Example 2

Provided herein was a gypsum-based mortar, which was prepared by mixing 33.515 parts by weight of a desulfurized hemihydrate gypsum, 32 parts by weight of a non-calcined diatomite, 32 parts by weight of natural sands, 1.5 parts by weight of nano TiO$_2$, 0.12 part by weight of a polycarboxylate superplasticizer, 0.1 part by weight of a redispersible emulsion powder, 0.035 part by weight of a gypsum retarder, 0.08 part by weight of a low-viscosity cellulose ether, 0.15 part by weight of a polyether defoaming agent and 0.5 part by weight of an inorganic pigment uniformly.

After mixed with water which was 74% by weight of the gypsum-based mortar, the mechanical properties of the gypsum-based mortar were shown in Table 5.

TABLE 5

Mechanical properties of the gypsum-based mortar prepared in Comparative Example 2

| Index | | |
|---|---|---|
| Setting time/h | Initial setting | 1.8 |
| | Final setting | 2.2 |
| Bending strength/MPa | Oven dry | 1.7 |
| Compressive strength/MPa | Oven dry | 3.5 |
| Tensile adhesive strength/MPa | Oven dry | 0.50 |
| Formaldehyde purification rate % | | 73.5 |
| Formaldehyde-removing durability % | | 69.6 |
| Releasing amount of negative ions (icon/cm$^3$) | | 450 |
| Efflorescence | | Not found |

Comparative Example 3

Provided herein was a gypsum-based mortar, which was prepared by mixing 31.515 parts by weight of a desulfurized hemihydrate gypsum, 32 parts by weight of a non-calcined diatomite, 31 parts by weight of natural sands, 4.0 parts by weight of a negative ion powder, 0.12 part by weight of a polycarboxylate superplasticizer, 0.1 part by weight of a redispersible emulsion powder, 0.035 part by weight of a gypsum retarder, 0.08 part by weight of a low-viscosity cellulose ether, 0.15 part by weight of a polyether defoaming agent and 0.5 part by weight of an inorganic pigment uniformly.

After mixed with water which was 74% by weight of the gypsum-based mortar, the mechanical properties of the gypsum-based mortar were shown in Table 6.

TABLE 6

Mechanical properties of the gypsum-based mortar prepared in Comparative Example 3

| Index | | |
|---|---|---|
| Setting time/h | Initial setting | 1.9 |
| | Final setting | 2.5 |
| Bending strength/MPa | Oven dry | 1.9 |
| Compressive strength/MPa | Oven dry | 3.8 |
| Tensile adhesive strength/MPa | Oven dry | 0.56 |
| Formaldehyde purification rate % | | 77.8 |
| Formaldehyde-removing durability % | | 43.5 |
| Releasing amount of negative ions (icon/cm$^3$) | | 9837 |
| Efflorescence | | Not found |

Described above are merely preferred embodiments of the invention, and it should be understood that various modifications and changes made by those skilled in the art without departing from the spirit of the invention should fall within the scope of the invention.

What is claimed is:

1. A gypsum-based mortar, comprising:
   30-35 parts by weight of a gypsum;
   30-35 parts by weight of a diatomite;
   1-2 parts by weight of nano TiO$_2$; and
   30-35 parts by weight of a fine aggregate.

2. The gypsum-based mortar of claim 1, comprising:
   31.015 parts by weight of the gypsum;
   32 parts by weight of the diatomite;
   1.5 parts by weight of the nano TiO$_2$; and
   30 parts by weight of the fine aggregate.

3. The gypsum-based mortar of claim 1, further comprising: 2-8 parts by weight of a negative ion powder having rare earth and tourmaline powders; wherein the negative ion powder is configured to release negative ions with one or more negative charges.

4. The gypsum-based mortar of claim 2, further comprising: 2-8 parts by weight of a negative ion powder having rare earth and tourmaline powders; wherein the negative ion powder is configured to release negative ions with one or more negative charges.

5. The gypsum-based mortar of 1, further comprising one or more admixtures selected from the group consisting of a water reducing agent, a dispersing agent, a gypsum retarder, a water retaining agent and a defoaming agent.

6. The gypsum-based mortar of claim 1, further comprising:
   3-7 parts by weight of a negative ion powder having rare earth and tourmaline powders, wherein the negative ion powder is configured to release negative ions with one or more negative charges;
   0.10-0.15 part by weight of a polycarboxylate superplasticizer;
   0.08-0.12 part by weight of a redispersible emulsion powder;
   0.025-0.04 part by weight of a gypsum retarder;
   0.05-0.10 part by weight of a water retaining agent;
   0.10-0.20 part by weight of a defoaming agent; and
   0.1-1.0 part by weight of an inorganic pigment.

7. The gypsum-based mortar of claim 2, comprising:
   4.5 parts by weight of a negative ion powder having rare earth and tourmaline powders, wherein the negative ion powder is configured to release negative ions with one or more negative charges;
   0.12 part by weight of a polycarboxylate superplasticizer;
   0.1 part by weight of a redispersible emulsion powder;
   0.035 part by weight of a gypsum retarder;
   0.08 part by weight of a water retaining agent;
   0.15 part by weight of a defoaming agent; and
   0.5 part by weight of an inorganic pigment.

8. The gypsum-based mortar of claim 1, wherein the gypsum is a α- or β-hemihydrate gypsum; and/or
   the diatomite is a non-calcined or calcined diatomite containing 70% or more by weight of SiO$_2$; and/or
   the nano TiO$_2$ has a diameter of 100 nm or less; and/or
   the gypsum-based mortar further comprises a negative ion powder having rare earth in amount of 60% or more and tourmaline powders in amount of 20% or more, wherein the negative ion powder is configured to release negative ions with one or more negative charges.

9. The gypsum-based mortar of claim 8, wherein the gypsum is a desulfurized hemihydrate gypsum; and/or
   the diatomite is the non-calcined diatomite.

10. The gypsum-based mortar of claim 1, wherein the fine aggregate is a natural river sand, a machine-made sand or a tailing sand; and/or
    a polycarboxylate superplasticizer is a polycarboxylate ether superplasticizer, a polycarboxylate ester superplasticizer or a combination thereof; and/or
    a redispersible emulsion powder is selected from the group consisting of an ethylene-vinyl acetate copolymer emulsion powder, an ethylene-vinyl chloride-vinyl laurate terpolymer emulsion powder, a vinyl acetate-ethylene-higher fatty acid vinyl ester terpolymer emulsion powder and a combination thereof; and/or
    a gypsum retarder is selected from the group consisting of tartaric acid, citric acid, sodium gluconate, a bone glue protein gypsum retarder and a combination thereof; and/or
    a water retaining agent is selected from the group consisting of methyl cellulose, carboxymethyl cellulose, hydroxyethyl cellulose, hydroxypropyl methyl cellulose and a combination thereof; and/or
    a defoaming agent is a polyether defoaming agent, a higher alcohol fatty acid ester complex, a polyether-modified silicon or a combination thereof; and/or
    an inorganic pigment is selected from the group consisting of metal oxide, chromate, carbonate, sulfate, sulfide and a combination thereof.

11. A method of preparing the gypsum-based mortar of claim 1, comprising:
    mixing all components of the gypsum-based mortar uniformly under stirring to produce the gypsum-based mortar.

12. A method of using the gypsum-based mortar of claim 1, comprising:
    mixing all components of the gypsum-based mortar under stirring to produce the gypsum-based mortar;
    mixing the gypsum-based mortar with water uniformly under stirring, wherein the water is 60%-80% by weight of the gypsum-based mortar; and
    applying the resulting mixture onto an interior wall in a non-humid environment for interior decoration.

13. A gypsum-based mortar comprising:
    30-40 parts by weight of a gypsum;
    30-40 parts by weight of a diatomite;
    0.5-3.0 parts by weight of nano TiO$_2$;
    30-40 parts by weight of a fine aggregate; and
    2-8 parts by weight of a negative ion powder having rare earth and tourmaline powders; wherein the negative ion powder is configured to release negative ions with one or more negative charges.

14. A gypsum-based mortar comprising:
30-40 parts by weight of a gypsum;
30-40 parts by weight of a diatomite;
0.5-3.0 parts by weight of nano $TiO_2$;
30-40 parts by weight of a fine aggregate;
2-8 parts by weight of a negative ion powder having rare earth and tourmaline powders, wherein the negative ion powder is configured to release negative ions with one or more negative charges;
0.10-0.15 part by weight of a polycarboxylate superplasticizer;
0.05-0.15 part by weight of a redispersible emulsion powder;
0.025-0.045 part by weight of a gypsum retarder;
0.05-0.10 part by weight of a water retaining agent;
0.10-0.20 part by weight of a defoaming agent; and
0.1-1.0 part by weight of an inorganic pigment.

* * * * *